C. CAMPUS.
INTERMITTENT TRANSMISSION MECHANISM.
APPLICATION FILED APR. 18, 1913.

1,132,436.

Patented Mar. 16, 1915.
3 SHEETS—SHEET 1.

WITNESSES:

INVENTOR
Cesare Campus.

BY
ATTORNEY

C. CAMPUS.
INTERMITTENT TRANSMISSION MECHANISM.
APPLICATION FILED APR. 18, 1913.

1,132,436.

Patented Mar. 16, 1915.
3 SHEETS—SHEET 2.

Fig. 1ª.

WITNESSES:
Gustav Rasmus.
William F. Nickel

INVENTOR
Cesare Campus.
BY
Laurence J. Gallagher
ATTORNEY

C. CAMPUS.
INTERMITTENT TRANSMISSION MECHANISM.
APPLICATION FILED APR. 18, 1913.
1,132,436.
Patented Mar. 16, 1915.
3 SHEETS—SHEET 3.
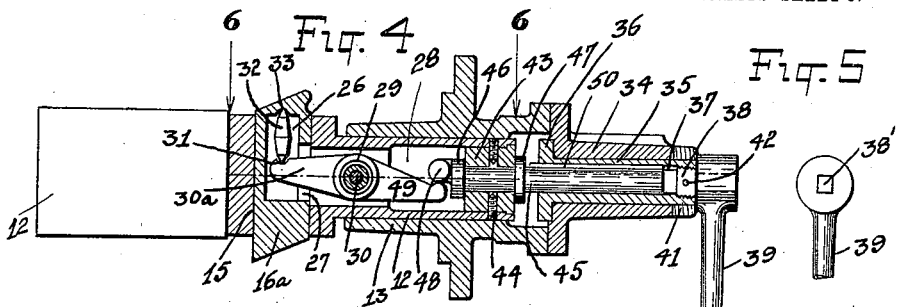
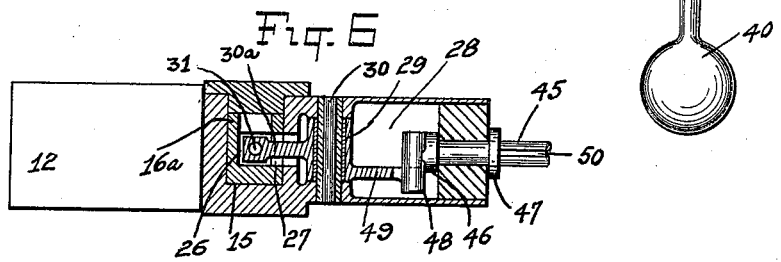
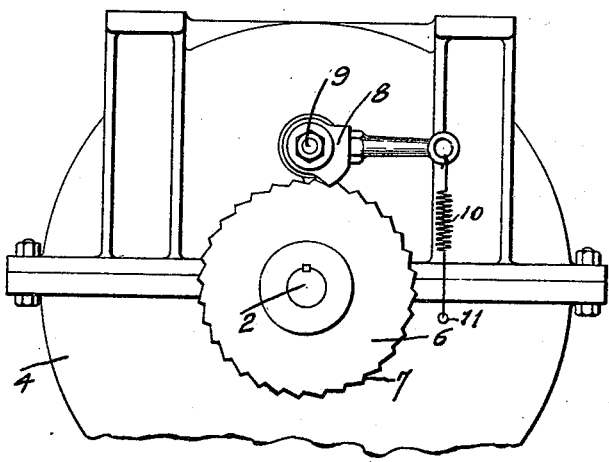
WITNESSES:
INVENTOR
Cesare Campus.
ATTORNEY

UNITED STATES PATENT OFFICE.

CESARE CAMPUS, OF NEW YORK, N. Y.

INTERMITTENT-TRANSMISSION MECHANISM.

1,132,436.  Specification of Letters Patent.  Patented Mar. 16, 1915.

Application filed April 18, 1913. Serial No. 761,904.

*To all whom it may concern:*

Be it known that I, CESARE CAMPUS, a subject of the King of Italy, and a resident of the city of New York, borough of Manhattan, in the county and State of New York, have made new and useful Improvements in Intermittent-Transmission Mechanisms, of which the following is a full, clear, and exact description.

This invention relates to new and useful improvements in mechanical movements, the advantages following the use of a structure embodying the inventive idea appearing more fully as the description of the construction and operation thereof proceeds.

Figure 1:
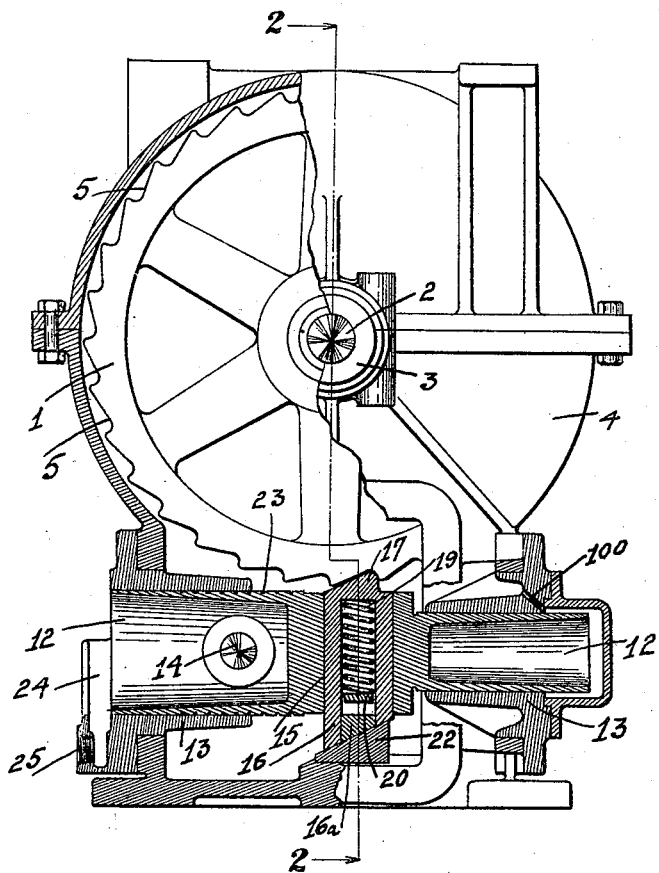
Figure 2:
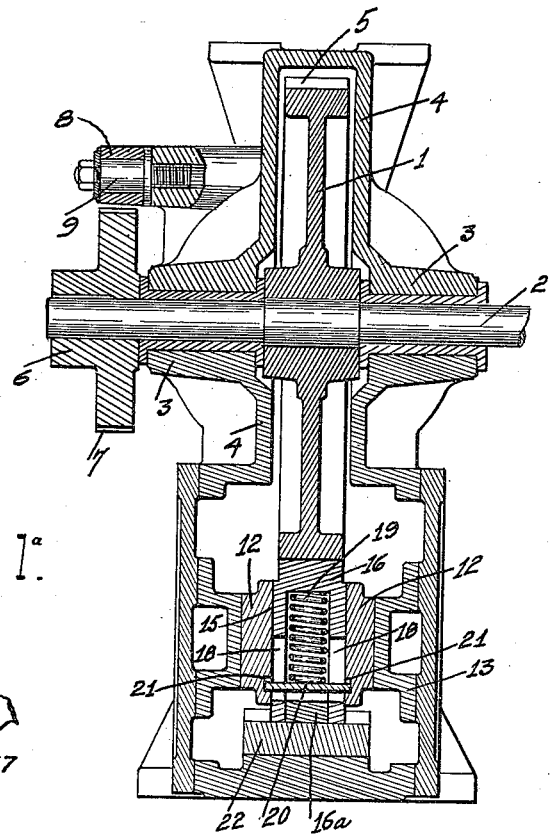

In the accompanying sheets of drawings, wherein like reference characters refer to like parts in the several views—Figure 1 is a partial vertical sectional view of the refined embodiment of the inventive idea; Fig. 1ª is a similar view showing a different relation of some of the parts; Fig. 2 is a sectional view on the line 2—2 of Fig. 1; Fig. 3 is a side view; Fig. 4 is a sectional view of a modified form of some of the elements; Fig. 5 is a partial end view thereof; while Fig. 6 is a sectional view on the line 6—6 of Fig. 4.

A revoluble member, such as a wheel 1 is mounted on a shaft 2 to turn therewith, the shaft being mounted in bearings 3, which, in this instance, are carried by the casing 4 which serves to inclose the parts; the peripheral portion of the wheel is provided with a succession of substantially similar and equally spaced pockets 5. Fixed on the shaft 2 is a wheel 6 having the periphery thereof provided with a number of serrations or teeth 7, equal in number to the pockets 5 on the wheel 1; a pawl 8, movably mounted on a pin or equivalent element 9, is adapted to engage with any tooth 7 and thereby prevent turning of the shaft and the wheels thereon in a counter-clockwise direction (Fig. 3); in order to maintain the pawl in coöperative relation with any tooth a spring 10 is employed, one end of which engages the outer end of the pawl and the other end of which engages a fixed support 11.

The wheel 1 is designed to partake of a periodic clockwise (Fig. 1) movement through the medium of parts to be now described. A reciprocating member 12 in the nature of a piston is mounted in the supports 13 and is provided with a pin 14 whereby a pitman may be engaged therewith in order to impart movement thereto; an opening 15 extends transversely of the member 12 and slidably mounted therein an element 16 having the upper end 17 formed to closely engage in a pocket 5 of the wheel 1 when the parts are in the position shown in Fig. 1; the sides of this element are arched as at 18 and the interior thereof forms a container for a spring 19, one end of which bears against the bottom wall of the container; extending transversely of this element 16 and through the arched sides thereof is a bar 20 the ends of which are received in pockets 21 formed in the member 12; the lower end of the before-mentioned spring 19 bears against this bar the result being that the end of the element 16 is brought into position in one of the pockets 5; the lower open end of the element 16 may be closed, if so desired, by a block 16ª.

Fixed beneath the reciprocating member 12 is a seat 22 the upper face of which inclines as shown particularly in Fig. 1, the lower end of the element 16 being similarly shaped whereby it may rest thereagainst. In the position of the parts shown in Fig. 1 the reciprocating member 12 is at the end of its travel toward the right; rotation of the wheel 1 in a clockwise direction is prevented by engagement of the pawl 8 with the serrated wheel 6, and rotation of the wheel 1 in a counter-clockwise direction is prevented by reason of the engagement of the element 16 with a pocket of the wheel and the seat 22; the wheel is thus locked in position; it is to be particularly noted from Fig. 1 that the top and bottom sides of the element 16 are parallel, these sides being also parallel with the top face of the seat 22 and the wall of the pocket 5 in the wheel 1; the upper end 17 of the element 16 and the pocket 5 are of such extent that large bearing surfaces are provided.

As the reciprocating member 12 moves toward the left of Fig. 1 the element 16 is forced downwardly because of the inclination of the wall of the pocket 5, further movement of the said member bringing the upper end of the element 16 into position in the next pocket 5, as shown in Fig. 1ª, the spring 19 urging the element into engagement as described; on the return movement of the reciprocating member toward the right of this figure the wheel 1 is moved the distance of one tooth, the wheel turning relatively to the end 17, the rounded conformations of the upper end of the element 16 and the pocket 5 permitting relative turning of these parts. The parts are designed to operate submerged in oil, the casing being formed to contain a suitable amount thereof; if so desired the member 12 may be provided with a number of channels to receive oil for lubrication, a pocket 24 being provided exteriorly of the casing to receive any overflow, an outlet 25 being formed in the pocket in order to withdraw it therefrom; an outlet 100 is also provided for oil circulation.

Various devices may be used to maintain the element 16 in engagement with one of the pockets 5 and in Figs. 4 to 6 inclusive a modified construction is set forth; the element 16$^a$ is mounted in an opening 15 in the reciprocating member 12 as already described, the element being provided with a recess 26 and the side wall thereof with an opening 27 communicating with the recess; the rear end of the reciprocating member 12 is provided with a recess 28 in which a lever 29 is positioned, being mounted on a shaft 30 extending transversely of the recess; one of the arms 30$^a$ of the lever extends through the opening 27 into the recess 26 in the element 16$^a$ and is provided with a pocket 31 in which one end of a post 32 is received, the other end of the post being engaged in a pocket 33 formed in the wall of the recess 26 in the element 16$^a$; the arrangement of the post and the pockets provides, in effect, a universal connection.

Fixed to the end of the support 13 is a bearing 34 having a sleeve 35 therein, the inner end of which is provided with a flange 36, a key-way 37 extending longitudinally of the sleeve; the outer end of this sleeve is threaded and receives a plug 38 having a squared end 38′ on which an arm 39 is carried, the arm being provided with a counterpoise 40; positioned on the outside of this sleeve is a collar 41, a pin 42 passing through the plug, sleeve and collar and maintaining the parts in fixed relation; the collar 41 and the flange 36 prevent movement of the sleeve 35 longitudinally of the bearing 34.

Fixed in the outer open end of the recess 28 in the member 12 is a bearing 43 held in position by means of the pins 44, the bearing supporting a shaft 45; the position of the shaft within the bearing is insured by means of the flanges 46, 47 carried thereby; the inner end of this shaft is provided with an arm 48 which engages with the arm 49 of the lever 29 and which tends to turn the lever about the support 30 thereby urging the element 16$^a$ upwardly; the outer end of the shaft 45 extends into the sleeve 35 and is provided with a key 50 which engages in the said key-way in the sleeve.

The arm 39 and counterpoise 40 do not hang vertically but are maintained at a suitable angle to a vertical plane passing through the center of the sleeve 35 so that there is a constant tendency of this sleeve to turn; by reason of the engagement of the key 50 and key-way 37 the shaft 45 also tends to turn in the same direction, which direction is such that the arm 49 of the lever 29 is moved downwardly and the arm 30$^a$ of the same lever upwardly, the result being that the element 16$^a$ is moved upwardly and brought into engagement with one of the pockets 5 in the wheel 1; during operation of the machine the member 12 and the shaft 45 move back and forth, the shaft being always in engagement with the sleeve 35 by reason of the key and key-way described, the result being that the element 16$^a$ is constantly influenced by a force urging it upwardly; the value of this force may, of course, be varied by changing the angle between the vertical plane and the plane passing through the arm 39 and the counterpoise 40.

The movement described is adapted to a variety of uses; the particular relation of the parts insures the locking of the wheel 1 at determined times which is advantageous in different forms of machines performing different operations.

What I claim as my invention is—

1. A mechanism as characterized, comprising a rotary member having a plurality of engagement recesses; a power transmission reciprocating member disposed tangential to said rotary member; a reciprocating engaging device mounted in said transmission member and movable in a path perpendicular to the line of movement of said transmission member, said device being shaped to conform to said recesses and to operatively engage the same; and a seating member disposed at the end of the path of said engaging device and in the plane of the radius of said rotary member perpendicular to said transmission member, said seat being insertible below said engaging device to hold the same against movement by said rotary member.

2. A mechanism as characterized, comprising a rotary member having a plurality of engagement recesses; a power transmission reciprocating member disposed tangential to said rotary member; a reciprocating engaging device mounted in said transmission member and movable in a path perpendicular to the line of movement of said transmission member, said device being shaped to conform to said recesses and to operatively engage the same; an elevating spring in said engaging device for elevating the same into engagement with said recesses; and a seating member disposed at the end of the path of said engaging device and in the plane of the radius of said rotary member perpendicular to said transmission member, said seat being insertible below said engaging device to hold the same against movement by said rotary member.

3. A mechanism as characterized, comprising a rotary member having a plurality of engagement recesses; a power transmission reciprocating member disposed tangential to said rotary member; a reciprocating engaging device mounted in said transmission member and movable in a path perpendicular to the line of movement of said transmission member, said device being shaped to conform to said recesses and to operatively engage the same; an elevating spring in said engaging device for elevating the same into engagement with said recesses; a seating member disposed at the end of the path of said engaging device and in the plane of the radius of said rotary member perpendicular to said transmission member, said seat being insertible below said engaging device to hold the same against movement by said rotary member; and means for holding said rotary member from retracting.

4. A mechanism as characterized having a rotary member provided with a plurality of ratchet-like engagement recesses; a power transmission reciprocating member disposed tangential to said rotary member; a pawl device reciprocatively mounted in said transmission member to engage said recesses; a spring for normally elevating said device to engage said recesses; and a seat insertible below said pawl at the end of the forward movement thereof, said seat having a rearwardly inclined surface to permit said pawl receding from said recesses when drawn backwardly by said transmission member.

5. A mechanism as characterized having a rotary member provided with a plurality of ratchet-like engagement recesses; a power transmission reciprocating member disposed tangential to said rotary member; a pawl device reciprocatively mounted in said transmission member to engage said recesses; a spring for normally elevating said device to engage said recesses; and a seat insertible below said pawl at the end of the forward movement thereof, said seat having a riding surface corresponding with the long incline of said recesses.

6. A mechanism as characterized having a rotary member provided with a plurality of ratchet-like engagement recesses; a power transmission reciprocating member disposed tangential to said rotary member; a pawl device reciprocatively mounted in said transmission member to engage said recesses; a spring for normally elevating said device to engage said recesses; and a seat insertible below said pawl at the end of the forward movement thereof, said seat having a riding surface parallel with the long incline of said recesses when said recesses are coincident with the radius of the rotary member perpendicular to the path of travel of said transmission member.

7. A mechanism as characterized, comprising a rotary member having ratchet-like engagement recesses; a power transmission reciprocating member; an engaging member slidably mounted in said power transmission member, said engaging member being shaped at one end to fit said recesses, the opposite end of said engaging member being shaped in correspondence to the engaging end thereof; and an inclined seating member disposed beyond the radius of said rotary member, which is perpendicular to the axis of said power transmission member, said seating member being removed from said reciprocating member and the recesses thereof in superposed relation thereto, a distance corresponding with the length of said engaging member for fixing the position of said rotary member against movement progressive or retractive, when said engaging member fully engages one of said recesses and said seating member.

8. A mechanism as characterized, comprising a rotary member having a plurality of ratchet-like engagement recesses; a reciprocating power member; a seating member disposed below said rotary member and beyond the radius thereof, which is perpendicular to the axis of said power member, the upper surface of said seating member being parallel with the long surface of said recesses, when said recesses are disposed directly above said seating member; and an engaging member slidably mounted in said reciprocating power member, the opposite ends of said engaging member being inclined and parallel to match said recesses and seating member, when said engaging member is raised by said seating member fully into the recesses directly above said seating member to prevent movement of said rotary member in either rotary direction.

9. A mechanism as characterized, comprising a rotary member having a plurality of engagement recesses, said recesses each having a straight rearwardly opening wall; a reciprocating power member disposed adjacent said rotary member, said reciprocating member being provided with a passage perpendicular to the axis of said reciprocating member, and means for moving said reciprocating member in its power stroke to place said passage beyond the radius of the rotary member, which is perpendicular to the axis of said reciprocating member; a seating member stationarily disposed in line with said passage adjacent the end thereof, opposite that end adjacent said rotary member, said seating member having a rearwardly inclined wall, said wall being parallel with the rearwardly opening walls of each of said recesses when disposed in line with said passage; and an engaging member reciprocatively mounted in said passage, said member having inclined ends, the walls whereof are parallel and shaped to fit the inclined wall of said seating member and said recesses when disposed in line with said passage and above said seating member, said engaging member operating to prevent the rotary movement of said rotary member in either direction, and adapted for withdrawal from said recesses and said seating member, without retracting said rotary member.

In testimony whereof I have hereunto signed my name in the presence of two witnesses.

CESARE CAMPUS.

Witnesses:
WILLIAM F. NICKEL,
LAURENCE J. GALLAGHER.

Copies of this patent may be obtained for five cents each, by addressing the "Commissioner of Patents, Washington, D. C."